US000001037H

United States Statutory Invention Registration [19]

[11] Reg. Number: H1037

Hatch

[43] Published: Apr. 7, 1992

[54] LOW FRICTION ROTARY HYDRAULIC DRIVE

[75] Inventor: Frank E. Hatch, Los Angeles, Calif.

[73] Assignee: The United States of America as represented by the Secretary of the Army, Washington, D.C.

[21] Appl. No.: 760,777

[22] Filed: Sep. 13, 1991

[51] Int. Cl.[5] ..... F16J 1/14

[52] U.S. Cl. ..... 92/187; 92/153; 92/158

*Primary Examiner*—Michael J. Carone

*Attorney, Agent, or Firm*—Fred M. Bush; Hugh P. Nicholson

[57] ABSTRACT

The device of the invention comprises a ball and socket and shoe assembly which is pressure balanced with hydraulic fluid. This combination provides for low friction and relatively large travels when used as a linear to rotary motion actuator. In accordance with the contributions of the structural elements of the device, hydraulic pressure is applied to the rear of a piston by modulating the fluid pressure through a servo valve. Four pistons are typically used with two pistons driving the support spider clockwise and the other two driving the support spider counter clockwise. The control pressure produces a force through both the piston and pressure balanced shoes. The force is transmitted to the spider which is pivoted about flexures to produce a torque which results in a rotary motion of the spider (support).

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LOW FRICTION ROTARY HYDRAULIC DRIVE

DEDICATORY CLAUSE

The invention described herein was made in the course of or under a contract or subcontract thereunder with the Government; therefore, the invention described herein may be manufactured, used and licensed by or for the government for governmental purposes without the payment to me of any royalties thereon.

BACKGROUND OF INVENTION

Pointers and trackers for use on moving vehicles, particularly when installed on aircraft require multi-axis rotational capabilities. When pointers and trackers are installed on a moving, high-speed vehicle such as an aircraft, acquiring a target such as a star or any other distantly located target which is desired to be pointed toward and subsequently tracked, a real challenge is recognized which requires the coordination of research and development between many disciplinary scientific fields including chemistry, physics, engineering, metallurgy, ceramics, and including many other specializations within the broadly identified disciplinary fields.

The prior art systems having related design elements which include pistons and spider design are identified with the following programs: Airborne Pointer and Tracker (APT), Navy Pointer Tracker (NPT), and Airborne Optical Adjunct (AOA). It is recognized that the use of piston and spider designs have progressively improved with respect to more travel range in the fine drives region. For example, APT design used a piston and spider design which included a spherical head with a $\pm 5$ milliradian (mR) travel. NPT used a spherical head contacting at the piston center for $\pm 10$ milliradian travel. AOA used a cylindrical roller to achieve $\pm 25$ milliradian travel. The spider design refers to the spacial arrangement of flexure leaves in a four quadrant relationship to convert force to rotary motion of the spider.

The currently used AOA device employs a roller mechanism for the fine drive axes. Desirable is a device which will allow for larger travels and lower friction while producing a stiffer structural coupling between the actuator and the load.

SUMMARY OF THE INVENTION

A primary object of this invention is to provide a device with low friction and with a relatively large travel when used as a linear to rotary motion actuator.

Another object of this invention is to provide a three axis rotary decoupling and two axis linear decoupling for a hydraulic linkage drive system with a hydraulic pressure balanced mechanism for low friction and high axial stiffness.

Still a further object of this invention is to provide a device that is more tolerant to dimensional inaccuracies which overcomes the requirement of the prior art device which required accurate parallelism for the roller mechanism to distribute the load.

The device of the invention comprises a ball and socket and shoe assembly which is pressure balanced with hydraulic fluid. This combination provides for low friction and relatively large travels when used as a linear to rotary motion actuator. In accordance with the contributions of the structural elements of the device, hydraulic pressure is applied to the rear of a piston by modulating the fluid pressure through a servo valve. Four pistons are typically used with two pistons driving the support spider clockwise and the other two driving the support spider counter clockwise. The control pressure produces a force through both the piston and pressure balanced shoes.

DESCRIPTION OF THE PREFERRED EMBODIMENT

Figure 1:
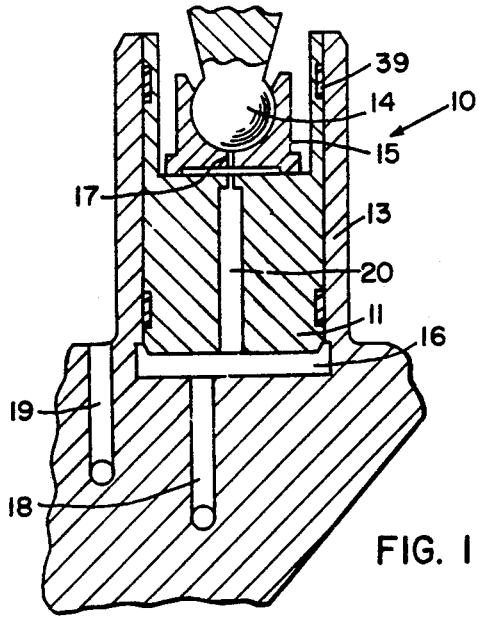
FIG. 1 is a sectional view of the low friction rotary hydraulic fine drive device 10 employing a ball and socket and shoe assembly.

FIG. 1 depicts a sectional view of the ball and socket and shoe assembly of the device 10 of this invention which provides for low friction and a relatively large travel when used as a linear to rotary motion actuator.

In further reference to the Figures of the Drawing, FIG. 1 depicts a piston 11 which is provided with low friction piston rings 39 and which is disposed in a cylinder 13. A ball and socket and shoe assembly is mounted to receive pressure applied to piston. A ball and socket 14 assembly is shown mounted within a pressure balanced shoe 15. Hydraulic pressure from a source (not shown) is applied to the rear of the piston 11 by modulating it through a servo valve. The control pressure 16 as monitored by a servo valve (not shown) produces a force through both the piston and through inlet 20 extending through centerline of piston to balanced shoe. The ball and socket design permits lubrication through a pressure feed orifice 17 from hydraulic fluid inlet 18 (from hydraulic fluid source not shown) extending through the centerline of piston 11 and shoe 15 to ball surface. Return outlet 19 which achieves a pressure balanced relationship of the force through both the piston and the shoe will be more fully appreciated after reviewing FIG. 2 and the explanation below of the free body diagram of shoe.

Figure 2:
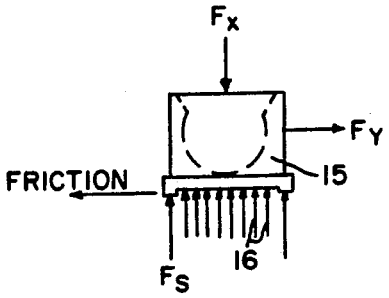
FIG. 2 is a free body diagram illustrating the forces on the shoe in the X and Y planes, hydraulic pressure and resultant force of the piston on shoe, and the direction of low friction; and, FIG. 3 illustrates a single device 10 relative to its mounted position and associated fixtures.

FIG. 2 depicts a free body diagram illustrating the forces on the shoe wherein $F_x$ and $F_y$ relate to a force on the ball on shoe in the X and Y planes respectively. $F_s$ represents force on shoe 15 exerted by hydraulic pressure 16.

Figure 3:
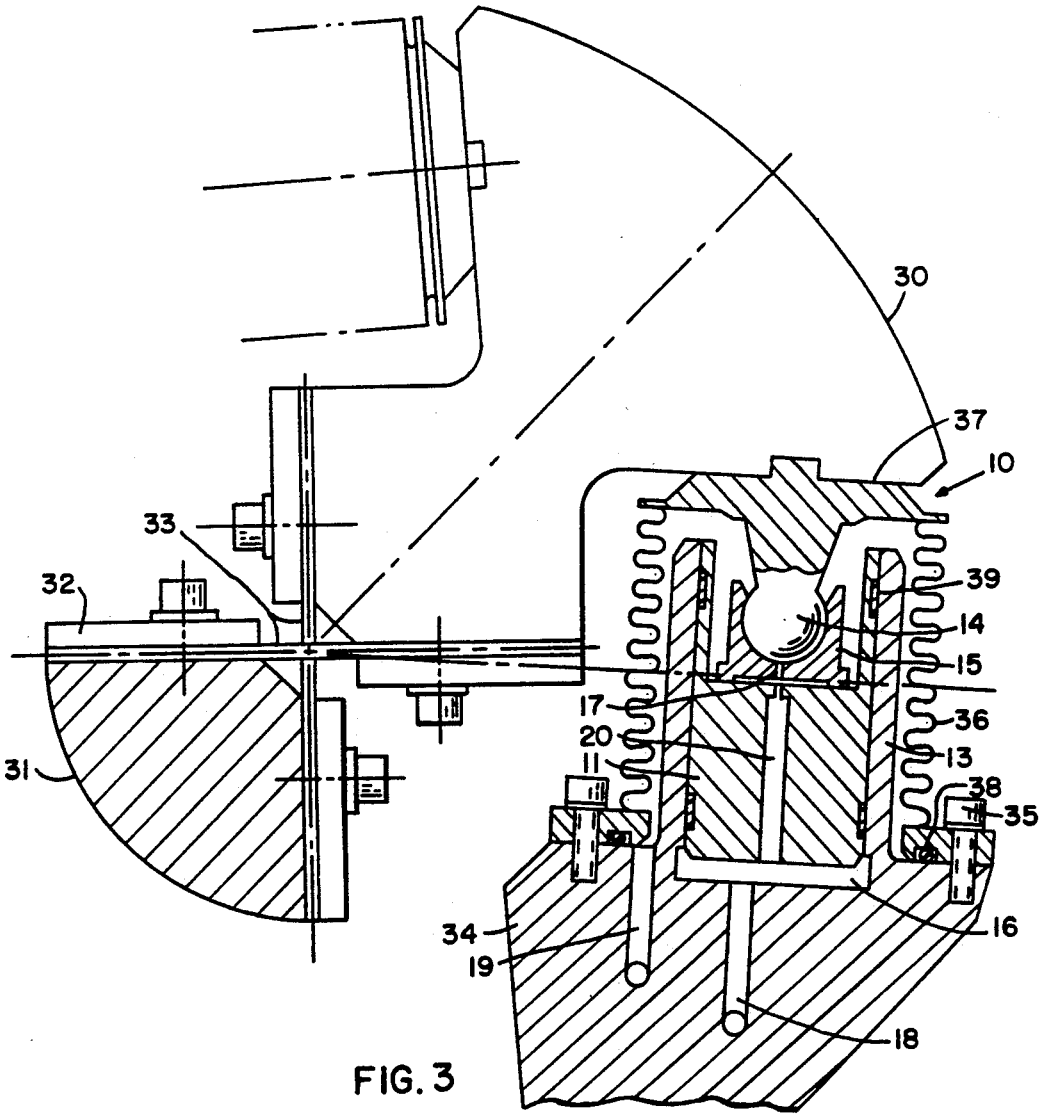

FIG. 3 depicts a single device 10 mounted on a moving flexure support 30. The device is depicted with associated hardware in its environment of use wherein the desired function is to move a sensor (as is the case with the AOA program) or is for moving another pointed device as further described below.

In use the single device is depicted in one quadrant for simplicity; however, four pistons (i.e. four devices) are typically used with two driving the support spider clockwise and the other two driving the support spider counter clockwise. The described combination provides a pure torque couple. Since the pressure as noted earlier produces a force through both the piston and the pressure balanced shoe, sizing of the shoe undercut was optimized to reduce friction and keep the stress at the shoe bearing surface low.

In further reference to FIG. 3 and the associated mounting hardware for the device, stationary flexure support 31 depicts a flexure leaf clamp 32 for clamping flexure leaves 33. The common elements for the device employ the same numeral designations as in FIG. 1; however, it is readily understood that the multifunctional stationary manifold 34 provides support for device 10 which is mounted with means for securing 35. Pressure for device 10 is retained by bellows 36 and bellows cap 37, o-rings 38, and compression rings or Rulon rings 39 on piston. Rulon is a trademark for the Teflon (polytetrafluoroethylene) ring commercially available from Dixon Corporation of Bristol, R.I.

Bellows 36 which is restrained by bellows cap 37 responds to pressure and the resultant force on the piston in a linear direction to permit rotary motion of the spider support. The stress at the shoe bearing surface is kept low by the optimization sizing of the shoes undercut. The pressure balanced shoe reduces the normal load which induces friction when the shoe must slide on the piston surface to allow for rotation from the linear movement of piston. This frictional force is in line with the center of rotation and, therefore, produces no frictional torque itself. It does, however, produce a frictional force on the piston which causes it to drag and results in a frictional torque. The result is friction which is proportional to the coefficient of friction squared. Since the surfaces are well lubricated due to hydraulic fluid as controlled by servo valve and fluid flow through inlet 20 and orifice 17 the coefficient of friction is a very low number (approximately 0.05) and when squared becomes even lower resulting in a very low frictional torque. Other effects, of course, add to this torque, e.g. piston ring friction and socket friction; but the shoe friction normally dominates. The ball and socket design in accordance with this invention is also well lubricated with a pressure feed orifice. The large surface contact between the shoe and the piston results in a very stiff coupling. The stiff coupling feature is very critical for good servo control. The end result is a low friction rotary actuator capable of relatively large travels with good structural stiffness.

The process of undercutting the shoe to provide a partial pressure balance can easily be extended to provide a hydrostatic bearing surface. This would require placing the ball and socket outside the piston to allow for a larger shoe than piston area. The result would be much less friction but at the expense of stiffness.

I claim:

1. A low friction rotary hydraulic drive device which comprises a ball and socket and pressure balanced shoe assembly for use with a spider design wherein a force is transmitted to a spider support which is pivoted about flexures to produce a torque to achieve a rotary motion of said spider support, said low friction rotary hydraulic drive device comprising:

i) a multifunctional manifold which functions to provide support for said device including inlet and outlet for hydraulic fluid system contained within bellows of said device;

ii) a cylinder disposed in said multifunctional manifold, said cylinder for containing a piston which functions under hydraulic pressure;

iii) an inlet for admitting hydraulic fluid into said cylinder above a piston installed in said cylinder, said hydraulic fluid for exerting hydraulic pressure on said piston and through the centerline of said piston to achieve a pressure balanced relationship for said piston, said ball and socket and shoe assembly;

iv) a piston installed within said cylinder and having a plurality of compression rings for containing a hydraulic fluid pressure balanced relationship between said piston, said ball and socket, and said shoe assembly;

v) an inlet for hydraulic fluid extending through centerline of said piston to supply hydraulic fluid to a pressure feed orifice through centerline of said shoe;

vi) a shoe of a predetermined size installed in said cylinder in contact with said piston, said shoe having a socket as an intergral part thereof for receiving a socket to complete a ball and socket and balanced shoe assembly which is moveable on said piston in response to hydraulic pressure to achieve a balanced relationship for said shoe assembly;

vii) a pressure feed orifice extending through centerline of said shoe to maintain lubrication of said ball and socket and required pressure balance for said pressure balanced shoe assembly;

viii) a bellows cap having bellows attached thereto, said bellows cap serving to retain said ball and socket and to secure one end of said bellows; and, ix) means for securing other end of said bellows said stationary manifold in a hydraulic pressure balanced relationship whereby said hydraulic fluid as supplied under pressure controlled by servo valve to said cylinder above said piston to exert a linear force on said piston and a fluid pressure through said piston to said pressure balanced ball and socket and shoe assembly, whereby said pressure balanced shoe reduces the normal load and induces friction when said shoe must slide on said piston to allow for rotation from linear position movement to provide for low friction and relatively large travels when said device serves to transfer a linear to rotary movement to a force which is transmitted to a spider pivoted about flexures to produce a torque which results in a rotary motion of the spider support.

2. The low friction rotary hydraulic drive device as disclosed in claim 1 wherein said plurality of said compression rings are constructed of polytetrafluoroethylene.

3. The low friction rotary hydraulic drive device as disclosed in claim 2 wherein said device is in a mounted relationship on a moving flexure support and flexure leaves to achieve said rotary motion of said spider support pivoted about said flexures to thereby achieve movement of a sensor or other pointed device for fine drive axes.

4. The low friction rotary hydraulic drive device as disclosed in claim 3 wherein said device is mounted in said mounted relationship which is four quadrant relationship whereby two of said devices drive said support spider support in a clockwise direction of movement and whereby two additional said devices drive said support in a counter clockwise direction of movement.

* * * * *